ROTARY INDEXING INDICIA-CARRYING MECHANISM

Filed Dec. 12, 1968

INVENTOR
LLOYD L. ROBBINS

BY Nilsson + Robbins
ATTORNEYS

1

3,606,695

ROTARY INDEXING INDICIA-CARRYING MECHANISM

Lloyd L. Robbins, 1627 South 13th East, Salt Lake City, Utah 84105

Filed Dec. 12, 1968, Ser. No. 783,272
Int. Cl. G09f *11/04*
U.S. Cl. 40—70R 1 Claim

ABSTRACT OF THE DISCLOSURE

Disclosed is indicia displaying apparatus comprising a pair of disks at least one of which is transparent having sandwiched therebetween indicia-carrying means. The disks are rotatable with respect to each other and by such rotation the indicia-carrying means is manipulated so as to selectively display a predetermined portion of said indicia as desired by the user.

BACKGROUND OF THE INVENTION

It is often desirable to obtain one desired piece of information which is normally retained with large amounts of similar information. Typically, to obtain such desired piece of information requires a great deal of research or reading of indexes or the like in order to isolate the location of that desired piece of information. Thereafter, that is upon isolation of the information, the user must then locate the position of the information and go to it for use. In those areas wherein the desired information can be reduced to a relatively small area which still may be visually displayed at the will of the user, such research is time-consuming and often frustrating. Such is particularly the case where certain pieces of information contained in an overall grouping are used more often than others. As an example, certain recipes as those of cocktails among all of those available, are most often used. If the information were readily available on an easily manipulatable device, it would be much simpler for the user.

SUMMARY OF THE INVENTION

An apparatus for selectively displaying desired information which comprises a transparent viewer disk rotatably secured to a base disk and having indicia-carrying means sandwiched between and manipulatable by the disks as they are rotated with respect to each other.

DESCRIPTION OF AN EMBODIMENT OF THE INVENTION

Figures 1, 2, 3, 4, 5, 6, 7:
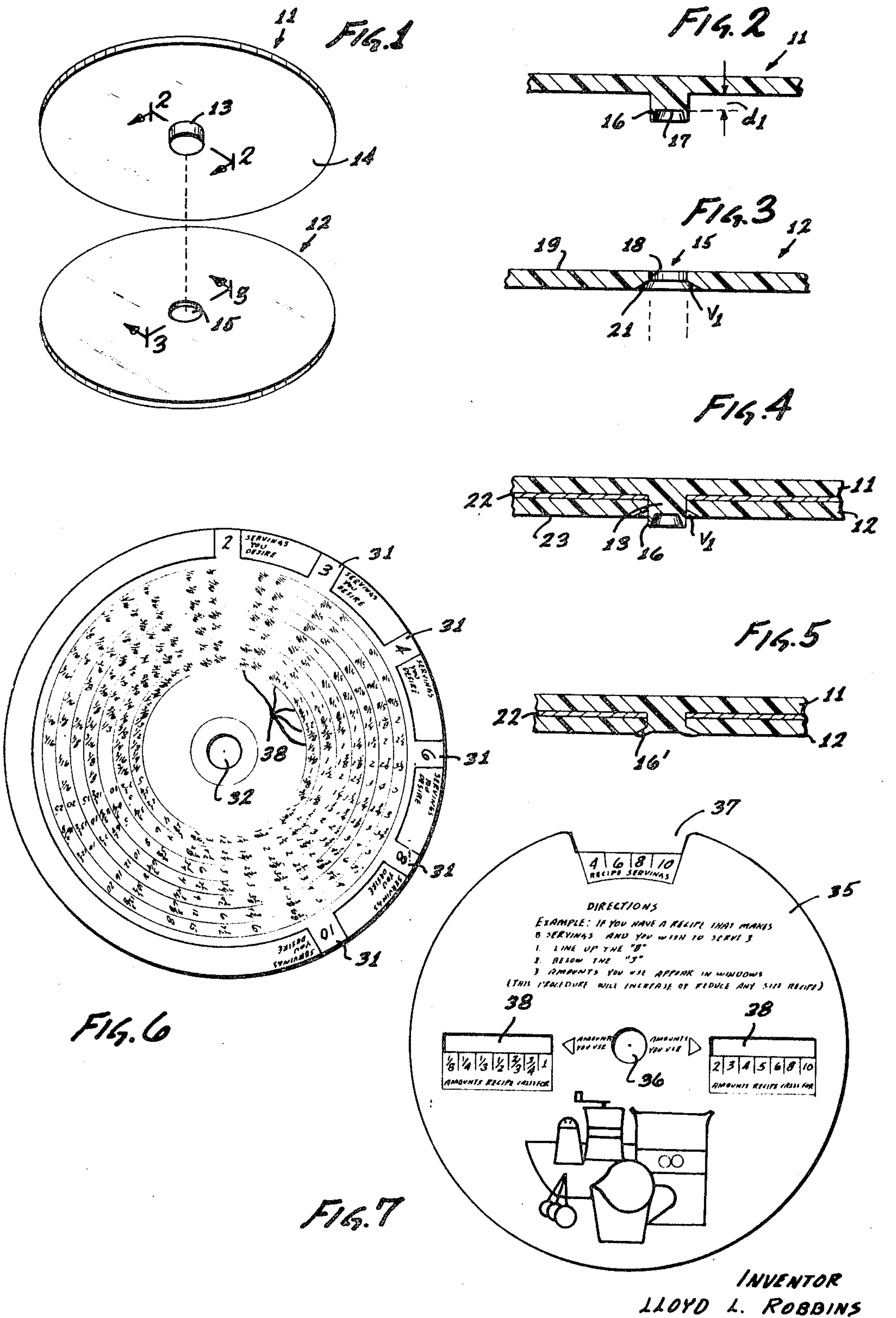
FIG. 1 is an exploded view of the base and viewer disks.
FIG. 2 is a cross-sectional view of the viewer disk tak- along the lines 2—2 of FIG. 1.
FIG. 3 is a cross-sectional view of the base disk taken along the lines 3—3 of FIG. 1.
FIG. 4 is a cross-sectional view showing the viewer and base disk engaged during an intermediate step of manufacture.
FIG. 5 shows the completed assembly of the viewer and base disks.
FIGS. 6 and 7 illustrate one generalized form of the indicia-carrying means which may be utilized in accordance with the present invention.

As is shown in FIG. 1, apparatus in accordance with the present invention includes a viewer disk 11 and a base disk 12. The viewer disk 11 has a shank or rivet 13 protruding outwardly from an inner surface 14 thereof. Preferably the viewer disk 11 is integrally molded of transparent plastic.

2

The base disk 12 defines an opening 15 therethrough which is adapted to matingly receive the shank 13 on the viewing disk 11. As is illustrated more clearly in FIGS. 2 and 3, when the disks 11 and 12 are brought together, they are maintained in a fixed, rotatable relationship for further use and the way in which this relationship is achieved and maintained is there illustrated.

As is shown in FIG. 2, the shank 13 is formed in such a manner that at the outer end thereof there is provided a lip 16 which protrudes beyond a base 17. It should be noted that the distance $d_1$ from the base 17 to the inner surface of the viewing disk 11 is the same as the thickness of the base disk 12 plus the thickness of the indicia-carrying means sandwiched between the base and viewing disks.

By reference now to FIG. 3, the purpose of the lip 16 will become more apparent. As is shown in FIG. 3, the opening 15 is formed so as to have a straight or cylindrical portion 18 extending inwardly from the inner surface 19 thereof. At approximately the mid-point of the thickness of the disk 12, the opening 15 flares out so as to form the truncated cone surface 21. The volume formed by that portion of the truncated cone extending beyond an extended surface of the opening 18, it should be noted, is the same as the volume of the lip 16 extending beyond the base 17 on the shank 13.

Referring now to FIG. 4, the two disks 11 and 12 are shown with their inner surfaces brought together and an indicia-carrying means 22 sandwiched therebetween. As is shown in FIG. 4, the shank 13 extends outwardly beyond the outer surface 23 of the disk 12 by the amount of the lip 16 as above described. As is also shown the volume $V_1$ is unoccupied. As will be readily apparent the assembly as shown in FIG. 4 is an interim stage of manufacture. After assembly as shown in FIG. 4, the lip 16 is upset such, for example, as being impacted by a heated anvil rapidly or constantly, depending upon the type of material being utilized, so as to cause the lip 16 to move or flow, either cold or hot flow, into and occupy volume $V_1$ while maintaining its structural integrity with the shank 13. As a result of such upsetting, the disks 11 and 12 are maintained in a non-separable position but at the same time are maintained so that rotation of one of the disks with respect to the other can be accomplished. The completed structure as above described is illustrated in FIG. 5 which clearly shows the disks 11 and 12 held together by the lip 16 now being upset as shown in 16′ to fill the volume $V_1$.

From the foregoing description, it should be apparent that any indicia-carrying means desired may be included and sandwiched between the viewing and base disks 11 and 12, respectively. By reference to FIGS. 6 and 7, one form which such indicia-carrying means may take is illustrated. In FIG. 6 there is shown an indicia-carrying means 31 defining an opening 32 therethrough to receive the shank 13 on the viewing disk 11. About the periphery of the member 31 there are provided indexing numbers or letters 32 which may take any form desired. Upon the face as illustrated at 34 of the member 31 there are provided a plurality of pieces of information, each corresponding to a given index number 32.

As shown in FIG. 7, there is a viewing and indexing member 35 also defining an opening therethrough to receive the shank 13. Along the outer periphery of the member 35, there is defined a notch or opening 37 to isolate a particular desired indexing number 32 along all of the indexing numbers appearing up around the periphery of the member 31. Member 35 also defines a viewing opening 38 positioned therein. The member 31 would be adhered to the inner surface 19 of the base disk 12 with the surface illustrated directed away from the disk 12.

The member 35 would be adhered to the inner surface 14 of the disk 11 with the surface illustrated against the surface 14. Thereafter, upon assembly as illustrated in FIGS. 4 and 5, the member 35 would cover the member 31. In this condition and upon manipulation of the disks, a particular index 32 would become viewable through the notch 37 and a particular recipe number or other desired indicia is thus isolated automatically and would become viewable through the opening 38. It should be obvious to those skilled in the art that any number of indexing notches or openings may be provided to correspond to any number of indexing marks and likewise a plurality of viewing windows may also be made available should such be desired.

What is claimed is:

1. Apparatus for selectively showing desired information in a predetermined pattern comprising:

(A) a transparent viewer disk having
  (1) an outer and an inner surface, and
  (2) an integral shank extending outwardly from the center of said inner surface thereof,
    (a) said shank at its terminal end having a base and a peripheral lip extending beyond said base and defining a cavity in said terminal end of said shank, said peripheral lip defining a first volume of material;

(B) a base disk having an outer and an inner surface and defining a centrally located aperture therethrough, said aperture having a first dimension, extending inwardly from said inner surface of said base disk, substantially equal to the dimension of said shank for matingly receiving said shank,
  (1) said aperture having a second dimension, extending inwardly from said outer surface of said base disk, said second dimension being larger than said first dimension so that when said inner surfaces of said viewer and base disks are brought together the space between the outer surface of said shank and said second dimension of said aperture defines a second volume,
  (2) said first and second volumes being substantially equal;

(C) indicia carrying means sandwiched between said inner surfaces of said disks and manipulatable by said disks;

(D) said shank having a length from said inner surface of said viewer disk to said base which is equal at least to the thickness of said base disk and said indicia carrying means; and (E) said peripheral lip being upset and positioned in said space, said first volume substantially filling said second volume for permanently securing said disks together.

References Cited

UNITED STATES PATENTS

| | | | |
|---|---|---|---|
| 1,584,559 | 5/1926 | Kroger | 40—70 |
| 3,313,045 | 4/1967 | Cummins | 40—70 |
| 3,365,818 | 1/1968 | Greiner | 35—74 |
| 3,471,956 | 10/1969 | Walters | 40—70 |
| 2,224,996 | 12/1940 | Walsh | 273—141 |
| 2,676,019 | 4/1954 | Steinberg | 273—141 |
| 3,399,893 | 9/1968 | Payne, Jr. | 273—141 |

ROBERT W. MITCHELL, Primary Examiner

L. R. OREMLAND, Assistant Examiner